US 12,231,061 B2

(12) United States Patent
Ido

(10) Patent No.: US 12,231,061 B2
(45) Date of Patent: Feb. 18, 2025

(54) POWER CONVERSION SYSTEM

(71) Applicant: Mitsubishi Electric Corporation, Tokyo (JP)

(72) Inventor: Yasunori Ido, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 209 days.

(21) Appl. No.: 17/776,672

(22) PCT Filed: Dec. 17, 2019

(86) PCT No.: PCT/JP2019/049464
§ 371 (c)(1),
(2) Date: May 13, 2022

(87) PCT Pub. No.: WO2021/124459
PCT Pub. Date: Jun. 24, 2021

(65) Prior Publication Data
US 2022/0399831 A1 Dec. 15, 2022

(51) Int. Cl.
*H02M 7/49* (2007.01)
*H02M 1/00* (2007.01)
(52) U.S. Cl.
CPC ........... *H02M 7/49* (2013.01); *H02M 1/0003* (2021.05)
(58) Field of Classification Search
CPC ...... H02M 7/49; H02M 7/003; H02M 7/4835; H02M 7/4837; H02M 7/487; H02M 7/483; H02M 1/0095
See application file for complete search history.

(56) References Cited

U.S. PATENT DOCUMENTS 10,819,217 B2 * 10/2020 Ido ...................... H02M 7/4835
11,632,060 B2 * 4/2023 Hario .................. H02M 7/4835
363/65
(Continued)

FOREIGN PATENT DOCUMENTS

JP 2013232823 A 11/2013
JP 6336236 B1 * 6/2018 .......... H02M 7/4835
(Continued)

OTHER PUBLICATIONS

Communication pursuant to Article 94(3) EPC dated Sep. 18, 2023, issued in the corresponding European Patent Application No. 19956295. 0, 9 pages.
(Continued)

*Primary Examiner* — Thienvu V Tran
*Assistant Examiner* — Yahveh Comas Torres
(74) *Attorney, Agent, or Firm* — BUCHANAN, INGERSOLL & ROONEY PC

(57) ABSTRACT

A power conversion system includes: power conversion circuitry including a plurality of submodules connected in series to each other; a host device to control each submodule included in the power conversion circuitry; a terminal device to display internal information about each submodule; and at least one repeating device to relay communication between the host device and each submodule and communication between the terminal device and each submodule. The repeating device receives, from one or more submodules communicating with the repeating device, internal information about the submodules, transmits, to the host device with a first cycle period, a first communication frame including aggregate information that is an aggregate of the received internal information, and transmits, to the terminal device with a second cycle period longer than the first cycle period,
(Continued)

a second communication frame including internal information selected from the received internal information.

9 Claims, 8 Drawing Sheets

(56) References Cited

U.S. PATENT DOCUMENTS

| | | | | |
|---|---|---|---|---|
| 2015/0355917 A1* | 12/2015 | Tsujimura | ........... | G06F 9/44505 710/104 |
| 2019/0157910 A1* | 5/2019 | Choi | ........................ | H02M 7/48 |
| 2020/0127583 A1 | 4/2020 | Adachi et al. | | |
| 2021/0075339 A1 | 3/2021 | Ido et al. | | |

FOREIGN PATENT DOCUMENTS

| | | | | |
|---|---|---|---|---|
| KR | 20140119352 A | * | 10/2014 | .............. H02M 7/44 |
| WO | WO-2018158935 A1 | * | 9/2018 | .............. H02M 1/32 |
| WO | 2018230327 A1 | | 12/2018 | |
| WO | 2019142361 A1 | | 7/2019 | |

OTHER PUBLICATIONS

Zhou, et al., "A Prototype of Modular Multilevel Converters", IEEE Transactions on Power Electronics, vol. 29, No. 7, Jul. 2014, pp. 3267-3278.

International Search Report (PCT/ISA/210) with translation and Written Opinion (PCT/ISA/237) mailed on Mar. 31, 2020, by the Japan Patent Office as the International Searching Authority for International Application No. PCT/JP2019/049464. (8 pages).

Dos Santos, et al., "Rapid Prototyping Framework for Real-time Control of Power Electronic Converters Using Simulink", IECON 2013—39th Annual Conference of the IEEE Industrial Electronics Society, XP032539257, Nov. 10, 2013, pp. 2303-2308.

Extended European Search Report issued in corresponding European Application No. 19956295.0, mailed on Nov. 9, 2022, 10 pages.

Zhang, et al., "Development of a Flexible Modular Multilevel Converter Test-Bed", IEEE Energy Conversion Congress and Exposition (ECCE), XP033463474, Sep. 23, 2018, pp. 5250-5257.

* cited by examiner

POWER CONVERSION SYSTEM

TECHNICAL FIELD

The present disclosure relates to a power conversion system converting AC power into DC power and vice versa.

BACKGROUND ART

The Modular Multilevel Converter (MMC) is known as a self-excited power converter used for a DC power transmission system. The Modular Multilevel Converter includes, for each phase of AC, an upper arm connected to a high-potential-side DC terminal and a lower arm connected to a low-potential-side DC terminal. Each arm is made up of a plurality of cascaded submodules. "Submodule" is also referred to as "converter cell."

WO2018/230327 (PTL 1) discloses a power conversion device of the MMC type for preventing the situation where the operation is difficult to continue due to the fact that a variation of the voltage across an energy storage device provided for each converter cell exceeds a limit.

CITATION LIST

Patent Literature

PTL 1: WO2018/230327

SUMMARY OF INVENTION

Technical Problem

Maintenance operators use a terminal device such as human machine interface (HMI) device to monitor a power converter. For example, the maintenance operators examine information about submodules displayed on the HMI device to monitor the power converter.

A host device (for example, a control device for controlling operation of the submodules, a protection device for protecting the submodules, or the like) for controlling the submodules are required to perform fast processing and thus required to have a shorter collection cycle period for collecting information necessary for the control. Meanwhile, it is enough for the HMI device to be able to update its screen at regular intervals for the maintenance operators, and therefore, the HMI device may have a longer collection cycle period for collecting information necessary for display by the HMI device. The HMI device, however, is responsible for providing various kinds of information to the maintenance operators, and it is therefore desired for the HMI device to be able to collect a larger amount of information per communication.

The HMI device, however, has been limited in terms of the amount of information that can be collected per communication, because the HMI device receives information about the submodules through the host device having a shorter information collection cycle period. This results in a problem that the HMI device cannot provide detailed information to the maintenance operators. PTL 1 does not teach or suggest solutions to the above problem at all.

An object according to an aspect of the present disclosure is to provide a power conversion system that enables information to be transmitted in a shorter cycle period to a host device and enables a larger amount of information to be transmitted at a time to a terminal device.

Solution to Problem

A power conversion system according to an embodiment includes: power conversion circuitry including a plurality of submodules connected in series to each other; a host device to control each submodule included in the power conversion circuitry; a terminal device to display internal information about each submodule; and at least one repeating device to relay communication between the host device and each submodule and communication between the terminal device and each submodule. The repeating device receives, from one or more submodules communicating with the repeating device, internal information about the submodules, transmits, to the host device with a first cycle period, a first communication frame including aggregate information that is an aggregate of the received internal information, and transmits, to the terminal device with a second cycle period longer than the first cycle period, a second communication frame including internal information selected from the received internal information.

Advantageous Effects of Invention

According to the present disclosure, information can be transmitted with a shorter cycle period to the host device, and a larger amount of information can be transmitted at a time to the terminal device.

DESCRIPTION OF EMBODIMENTS

Figure 1:
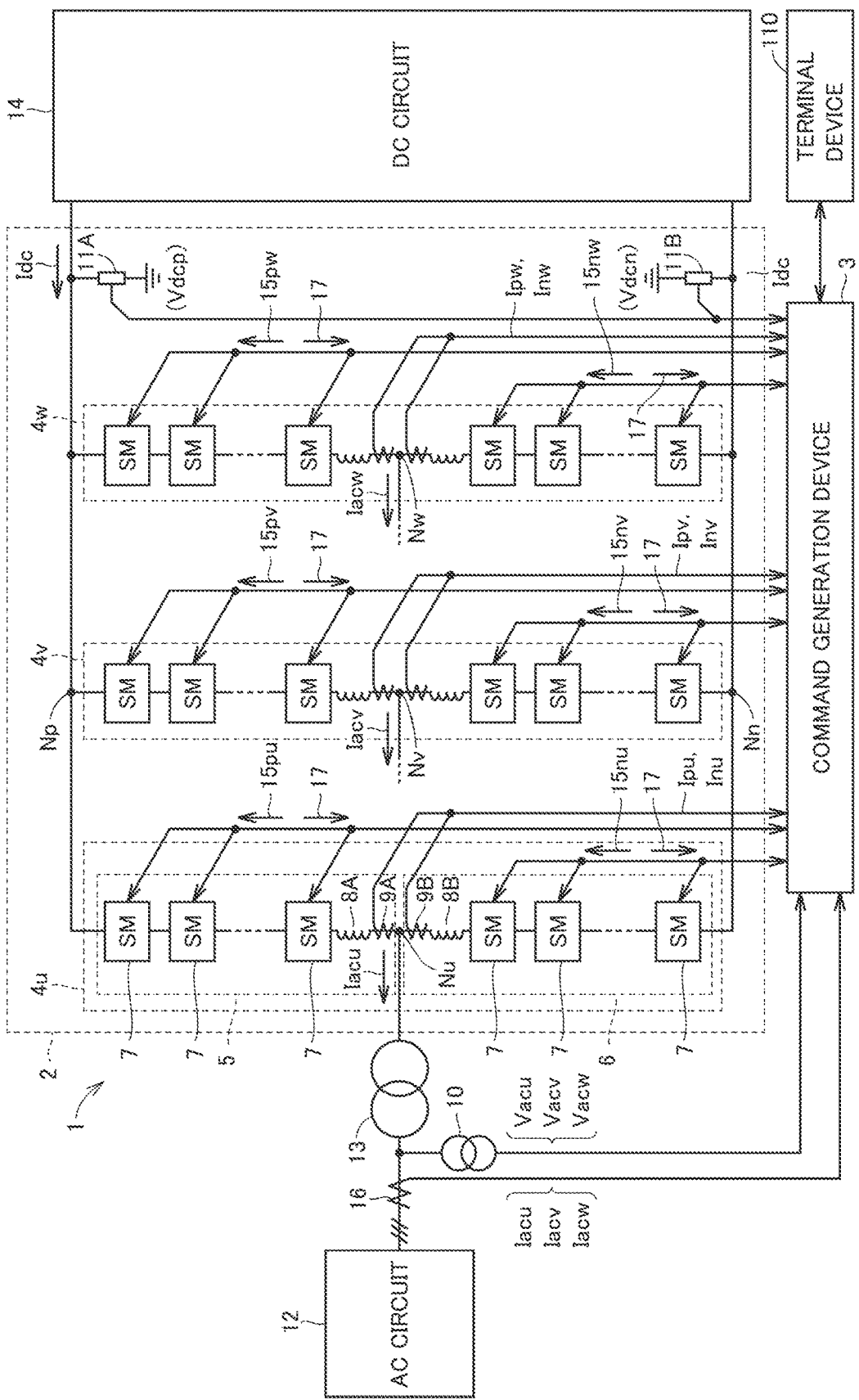
FIG. 1 is a schematic configuration diagram of a power conversion device.

Embodiments of the present disclosure are described hereinafter with reference to the drawings. In the following description, the same components are denoted by the same reference characters. They are named identically and function identically as well. Therefore, a detailed description thereof is not herein repeated.

<Configuration of Power Conversion Device>

FIG. 1 is a schematic configuration diagram of a power conversion device. Referring to FIG. 1, power conversion device 1 is configured in the form of a modular multilevel converter including a plurality of submodules (corresponding to "SM" in FIG. 1) 7 connected in series to each other. "Submodule" is also called "converter cell" or "unit converter." A power conversion system includes power conversion device 1 and a terminal device 110 having a function of displaying information to a maintenance operator. Power conversion device 1 performs power conversion between a DC circuit 14 and an AC circuit 12. Specifically, power conversion device 1 includes power conversion circuitry 2 and a command generation device 3.

Power conversion circuitry 2 includes a plurality of leg circuits 4u, 4v, 4w (hereinafter also referred to collectively as "leg circuit 4") connected in parallel with each other between a positive DC terminal (i.e., high-potential-side DC terminal) Np and a negative DC terminal (i.e., low-potential-side DC terminal) Nn.

Leg circuit 4 is provided for each of a plurality of phases of AC. Leg circuit 4 is connected between AC circuit 12 and DC circuit 14 for performing power conversion between the AC circuit and the DC circuit. AC circuit 12 shown in FIG. 1 is a three-phase AC system, and three leg circuits 4u, 4v, 4w are arranged for U phase, V phase, W phase, respectively.

AC input terminals Nu, Nv, Nw arranged respectively in leg circuits 4u, 4v, 4w are each connected through an interconnection transformer 13 to AC circuit 12. AC circuit 12 is an AC power system including an AC power source, for example. FIG. 1 does not show connection between AC input terminals Nv, Nw and interconnection transformer 13 for the sake of simplifying the drawing.

High-potential-side DC terminal Np and low-potential-side DC terminal Nn that are connected commonly to leg circuits 4 are connected to DC circuit 14. DC circuit 14 is a DC terminal for a DC power system including a DC transmission network or the like, or a DC terminal for another power conversion device, for example.

The leg circuits may be connected to AC circuit 12 through an interconnection reactor, instead of interconnection transformer 13 in FIG. 1. Further, instead of AC input terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, electrical connection (namely DC or AC connection) from leg circuit 4 to AC circuit 12 may be implemented through connecting parts such as AC input terminals Nu, Nv, Nw or the aforementioned primary windings arranged in respective leg circuits 4u, 4v, 4w.

Leg circuit 4u includes an upper arm 5 from high-potential-side DC terminal Np to AC input terminal Nu, and a lower arm 6 from low-potential-side DC terminal Nn to AC input terminal Nu. The connection point, i.e., AC input terminal Nu, between upper arm 5 and lower arm 6 is connected to interconnection transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded submodules 7 and reactor 8A. A plurality of submodules 7 and reactor 8A are connected in series to each other. Lower arm 6 includes a plurality of cascaded submodules 7 and reactor 8B. A plurality of submodules 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Alternatively, only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power converter is decreased. In the event of a fault, it is therefore preferable to stop (i.e., turn off) all switching devices in each submodule 7 as quickly as possible.

Power conversion device 1 includes, as detection devices for measuring the amount of electricity (current, voltage, for example) to be used for control, an AC voltage detection device 10, an AC current detection device 16, DC voltage detection devices 11A, 11B, and arm current detection devices 9A, 9B disposed in each leg circuit 4. Signals detected by these detection devices are input to command generation device 3.

Based on these detected signals, command generation device 3 outputs operation commands 15$pu$, 15$nu$, 15$pv$, 15$nv$, 15$pw$, 15$nw$ for controlling the operating states of respective submodules 7. Command generation device 3 also receives information 17 from each submodule 7. Information 17 is information on the inside of submodule 7 (also referred to as "SM internal information" hereinafter) and includes a voltage value of a capacitor 24 in submodule 7 and state information indicating a state of submodule 7, for example.

In the present embodiment, operation commands 15$pu$, 15$nu$, 15$pv$, 15$nv$, 15$pw$, 15$nw$ are generated for the U phase upper arm, the U phase lower arm, the V phase upper arm, the V phase lower arm, the W phase upper arm, and the W phase lower arm, respectively. In the following, operation commands 15$pu$, 15$nu$, 15$pv$, 15$nv$, 15$pw$, 15$nw$ may be referred to collectively or non-specifically as operation command 15.

For the sake of simplifying the drawing, FIG. 1 shows collectively some of signal lines for signals that are input from respective detection devices to command generation device 3 and signal lines for signals that are input or output between command generation device 3 and respective submodules 7. Actually, however, the signal line is disposed individually for each detection device and each submodule 7. In the present embodiment, these signals are transmitted through optical fibers for the sake of noise immunity.

AC voltage detection device 10 detects U phase AC voltage value Vacu, V phase AC voltage value Vacv, and W phase AC voltage value Vacw of AC circuit 12. AC current detection device 16 detects U phase AC current value Iacu, V phase AC current value Iacv, and W phase AC current value Iacw of AC circuit 12. DC voltage detection device 11A detects DC voltage value Vdcp of high-potential-side DC terminal Np connected to DC circuit 14. DC voltage detection device 11B detects DC voltage value Vdcn of low-potential-side DC terminal Nn connected to DC circuit 14.

Arm current detection devices 9A and 9B disposed in U phase leg circuit 4u detect upper arm current Ipu flowing in upper arm 5 and lower arm current Inu flowing in lower arm 6, respectively. Likewise, arm current detection devices 9A and 9B disposed in V phase leg circuit 4v detect upper arm current Ipv and lower arm current Inv, respectively. Arm current detection devices 9A and 9B disposed in W phase leg circuit 4w detect upper arm current Ipw and lower arm current Inw, respectively.

Terminal device 110 is an HMI device, for example, and displays various kinds of information about submodules 7

(SM internal information, for example). Terminal device 110 obtains SM internal information about submodules 7 through a repeating device in command generation device 3, which is detailed later herein. Terminal device 110 is a personal computer, for example, and includes, as hardware components, a processor, a memory, a communication interface, a display, and an input device (keyboard, mouse, and the like, for example).

Example Configuration of Submodule

Figure 2:
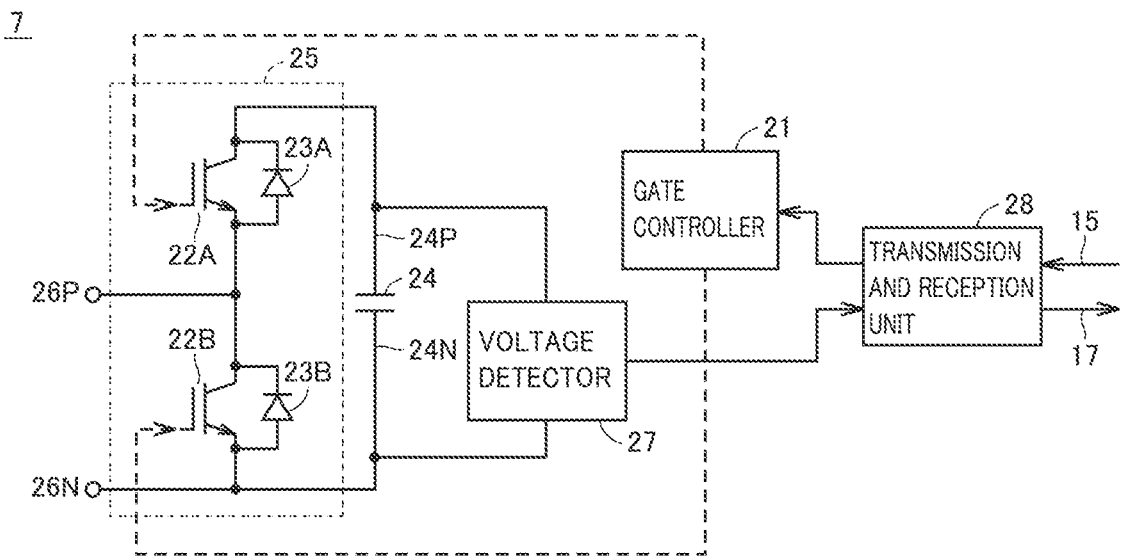
FIG. 2 is a circuit diagram showing an example of submodules forming each leg circuit in FIG. 1.

FIG. 2 is a circuit diagram showing an example of submodules forming each leg circuit in FIG. 1. Referring to FIG. 2, submodule 7 includes a half-bridge-type conversion circuit 25, a capacitor 24 serving as an energy storage device, a gate controller 21, a voltage detector 27, and a transmission and reception device 28. Gate controller 21, voltage detector 27, and transmission and reception device 28 may be implemented by a dedicated circuit, or implemented by an FPGA (Field Programmable Gate Array), or the like.

Conversion circuit 25 includes switching devices 22A, 22B connected in series to each other, and diodes 23A, 23B. Diodes 23A, 23B are connected in anti-parallel (i.e., in parallel in the reverse-bias direction) with switching devices 22A, 22B, respectively. Capacitor 24 is connected in parallel with the series-connected circuit made up of switching devices 22A, 22B for holding a DC voltage. A connection node of switching devices 22A, 22B is connected to a high-potential-side input/output terminal 26P. A connection node of switching device 22B and capacitor 24 is connected to a low-potential-side input/output terminal 26N.

Gate controller 21 operates in accordance with operation command 15 received from command generation device 3 in FIG. 1. During a normal operation (i.e., zero voltage or positive voltage is output between input/output terminals 26P and 26N), gate controller 21 performs control to cause one of switching devices 22A, 22B to be in the ON state and the other to be in the OFF state. While switching device 22A is in the ON state and switching device 22B is in the OFF state, a voltage across capacitor 24 is applied between input/output terminals 26P and 26N. While switching device 22A is in the OFF state and switching device 22B is in the ON state, the voltage between input/output terminals 26P and 26N is 0 V.

Thus, submodule 7 causes switching devices 22A, 22B to become the ON state alternately to thereby output zero voltage or a positive voltage depending on the voltage of capacitor 24.

Voltage detector 27 detects the voltage between opposite terminals 24P and 24N of capacitor 24. Transmission and reception device 28 transmits, to gate controller 21, operation command 15 received from command generation device 3 in FIG. 1, and transmits, to command generation device 3, information 17 (i.e., SM internal information) including the voltage of capacitor 24 (hereinafter also referred to simply as "capacitor voltage") detected by voltage detector 27.

As each of switching devices 22A, 22B, a self-arc-extinguishing-type switching device is used, of which ON operation and OFF operation can both be controlled. For example, IGBT (Insulated Gate Bipolar Transistor) or GCT (Gate Commutated Turn-off thyristor), for example, is used as switching device 22A, 22B.

The above-described configuration of submodule 7 is given as an example, and submodule 7 of any of other configurations may be applied to the present embodiment. For example, a full-bridge-type conversion circuit or a three-quarter-bridge-type conversion circuit may be used to form submodule 7.

<Configuration of Command Generation Device>

Figure 3:
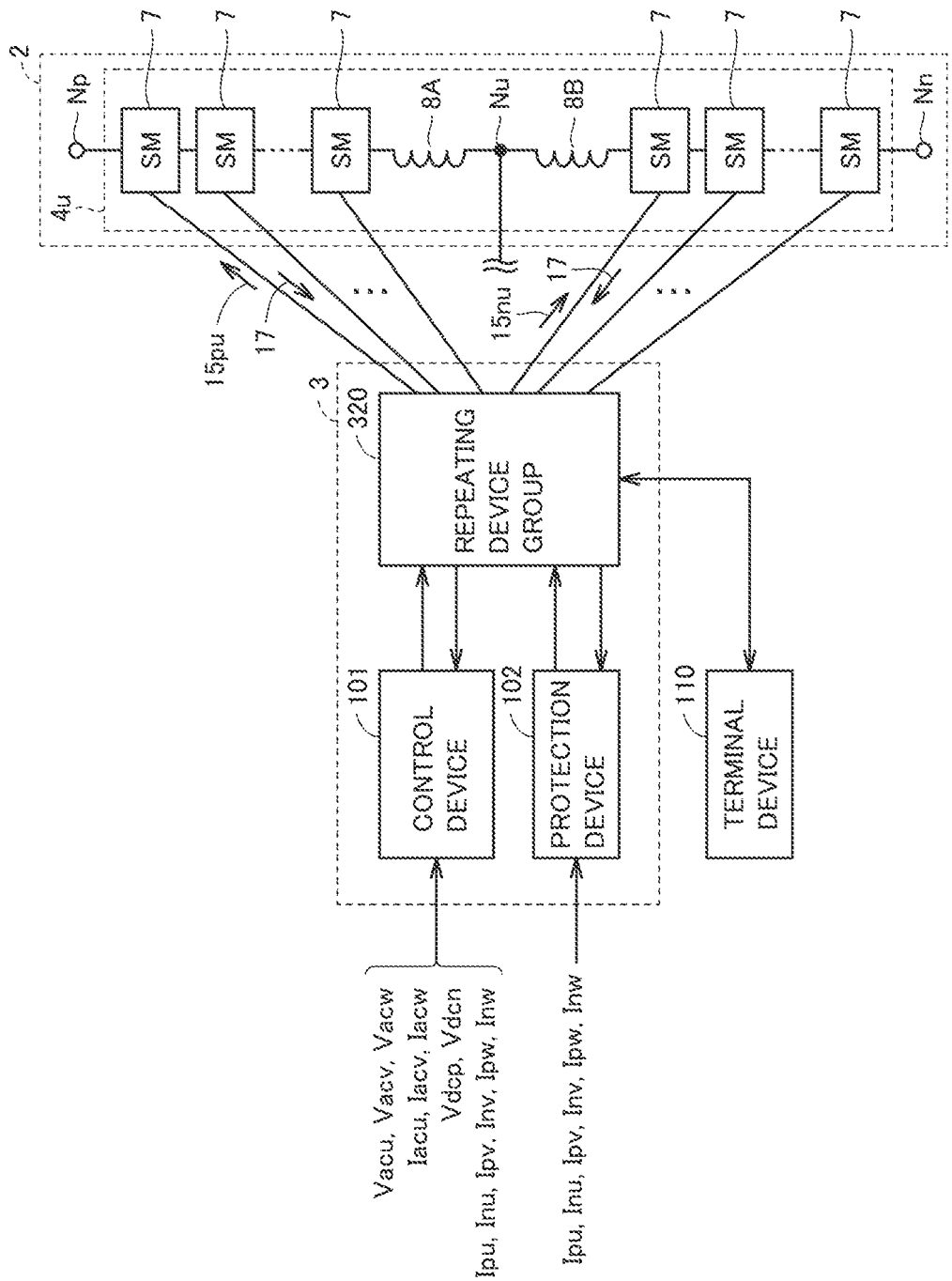
FIG. 3 is a block diagram showing a schematic configuration of a command generation device.

FIG. 3 is a block diagram showing a schematic configuration of the command generation device. Referring to FIG. 3, command generation device 3 includes a control device 101, a protection device 102, and a repeating device group 320 made up of a plurality of repeating devices. Each of control device 101 and protection device 102 corresponds to a host device for each repeating device included in repeating device group 320, and controls each submodule 7 included in power conversion circuitry 2. Each repeating device relays communication between the host device and each submodule 7, and relays communication between terminal device 110 and each submodule 7. While FIG. 3 exemplarily shows only leg circuit 4u for U phase in power conversion circuitry 2 of FIG. 1, other leg circuits 4v, 4w are similar to leg circuit 4u.

Each repeating device communicates with control device 101 and protection device 102 with a communication cycle period T1 (100 μs, for example). Each repeating device communicates with terminal device 110 with a communication cycle period T2 (10 ms, for example). Repeating device group 320 communicates with each submodule 7 with a communication cycle period T3 (a few μs, for example). It is seen from the above that cycle period T2 of communication between each repeating device and terminal device 110 is considerably longer than other communication cycle periods T1, T3.

Control device 101 is a device that controls operation of each submodule 7. Control device 101 receives input of AC voltage values Vacu, Vacv, Vacw, AC current values Iacu, Iacv, Iacw, DC voltage values Vdcp, Vdcn, upper arm currents Ipu, Ipv, Ipw, lower arm currents Inu, Inv, Inw, and capacitor voltage Vcap that are detected by respective detection devices in FIG. 1. Typically, capacitor voltage Vcap is an average of respective voltage values of capacitors 24 detected in respective submodules 7 of each arm circuit.

Based on each of the received detected values, control device 101 generates, for each communication cycle period T1, a control command for controlling operation of each submodule 7 during a normal operation control duration and outputs the generated control command to repeating device group 320.

The control command includes a voltage command and a current command, for example. The voltage command is, for example, an output voltage command value for upper arm 5 and an output voltage command value for lower arm 6, in each of leg circuits 4u, 4v, 4w. The current command is, for example, an output current command value for upper arm 5 and an output current command value for lower arm 6, in each of leg circuits 4u, 4v, 4w.

Typically, control device 101 includes, as hardware components, an auxiliary transformer, an AD (Analog to Digital) converter, and an operation unit, for example. The operation unit includes a CPU (Central Processing Unit), a RAM (Random Access Memory), and a ROM (Read Only Memory). The AD converter includes an analogue filter, a sample hold circuit, and a multiplexer, for example. Control device 101 may be configured, for example, in the form of a digital protection control device.

Protection device 102 is a device that protects each submodule 7. When at least one of the arm currents exceeds a threshold value, protection device 102 generates a protection command including a stop command for stopping operation of each submodule 7 and transmits the protection command to each repeating device 32. In contrast, when all the arm currents are less than the threshold value, protection device 102 may not generate a protection command, or may generate a protection command including a normal command for causing each submodule 7 to operate based on the control command. Protection device 102 transmits the protection command for each communication cycle period T1. Hardware components of protection device 102 may be similar to the hardware components of control device 101, for example.

Repeating device group 320 receives the control command from control device 101 and receives the protection command from protection device 102. Repeating device group 320 outputs, to each submodule 7, operation command 15 including at least one of the control command and the protection command. Each submodule 7 operates in accordance with operation command 15. Repeating device group 320 also receives, for each communication cycle period T3, SM internal information from each submodule 7. Repeating device group 320 transmits, to control device 101 and protection device 102 with communication cycle period T1, information that is an aggregate of SM internal information about respective submodules 7. Repeating device group 320 transmits, to terminal device 110 with communication cycle period T2, SM internal information selected from SM internal information about respective submodules 7.

<Network Configuration>

Figure 4:
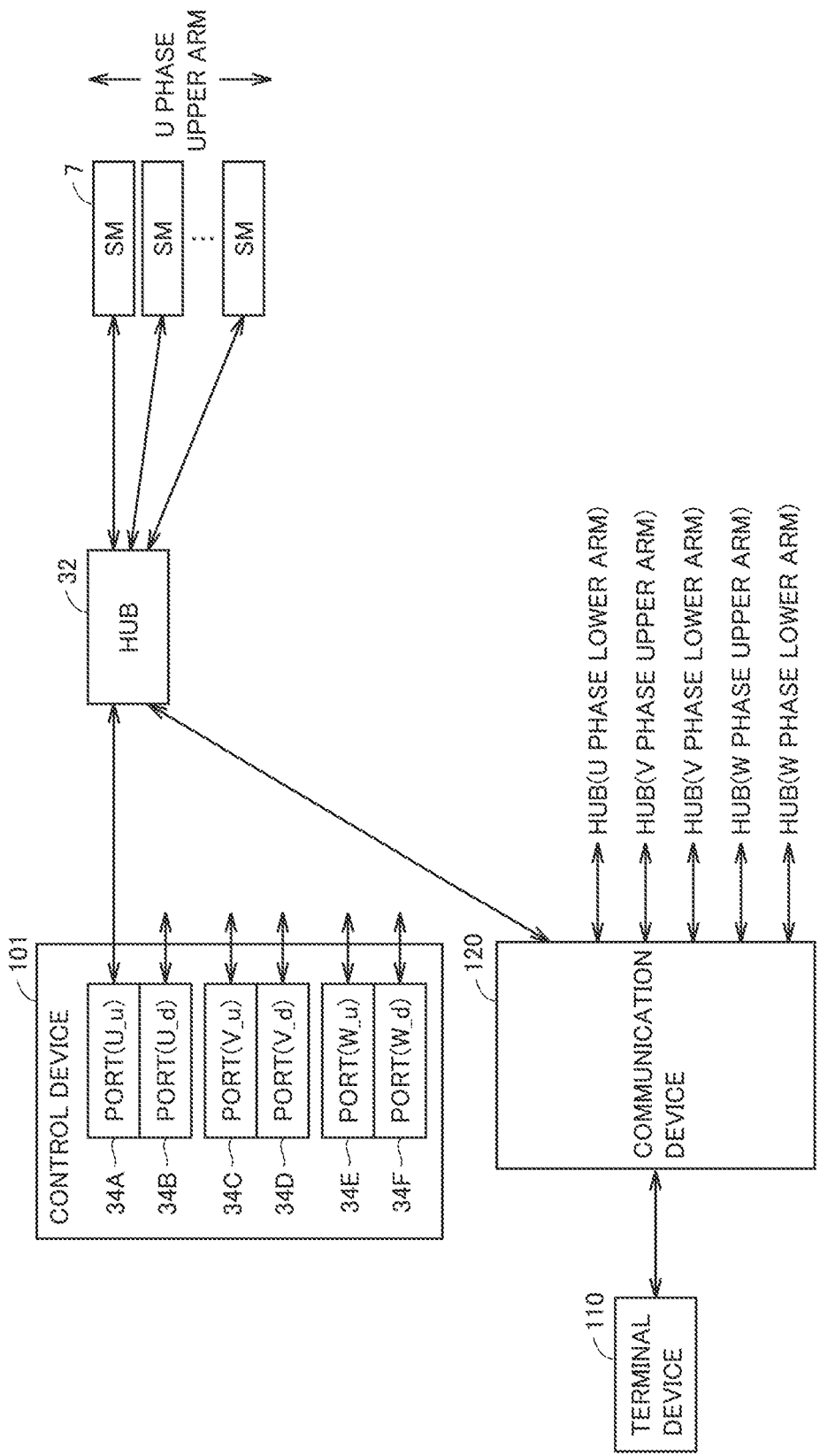
FIG. 4 shows an example of a network configuration between a control device/a terminal device and each repeating device.

FIG. 4 shows an example of a network configuration between control device 101/terminal device 110 and each repeating device 32. Referring to FIG. 4, control device 101 includes a communication port provided in association with each arm included in power conversion circuitry 2. Specifically, control device 101 includes a communication port 34A for the U phase upper arm, a communication port 34B for the U phase lower arm, a communication port 34C for the V phase upper arm, a communication port 34D for the V phase lower arm, a communication port 34E for the W phase upper arm, and a communication port 34F for the W phase lower arm.

Communication port 34A is connected to repeating device 32 (corresponding to "HUB" in the drawing) that relays data for the U phase upper arm. Repeating device 32 is connected to each submodule 7 through the star topology. Similarly, each of communication ports 34B to 34F is connected to repeating device 32 that relays data for its associated arm. Terminal device 110 communicates with repeating device 32 for each arm, through a communication device 120. Communication device 120 is an L3 switch, for example, and connected to repeating devices 32 for each arm through the star topology. Communication between terminal device 110 and repeating device 32 is implemented through a general-purpose network (IP network, for example).

Figure 5:
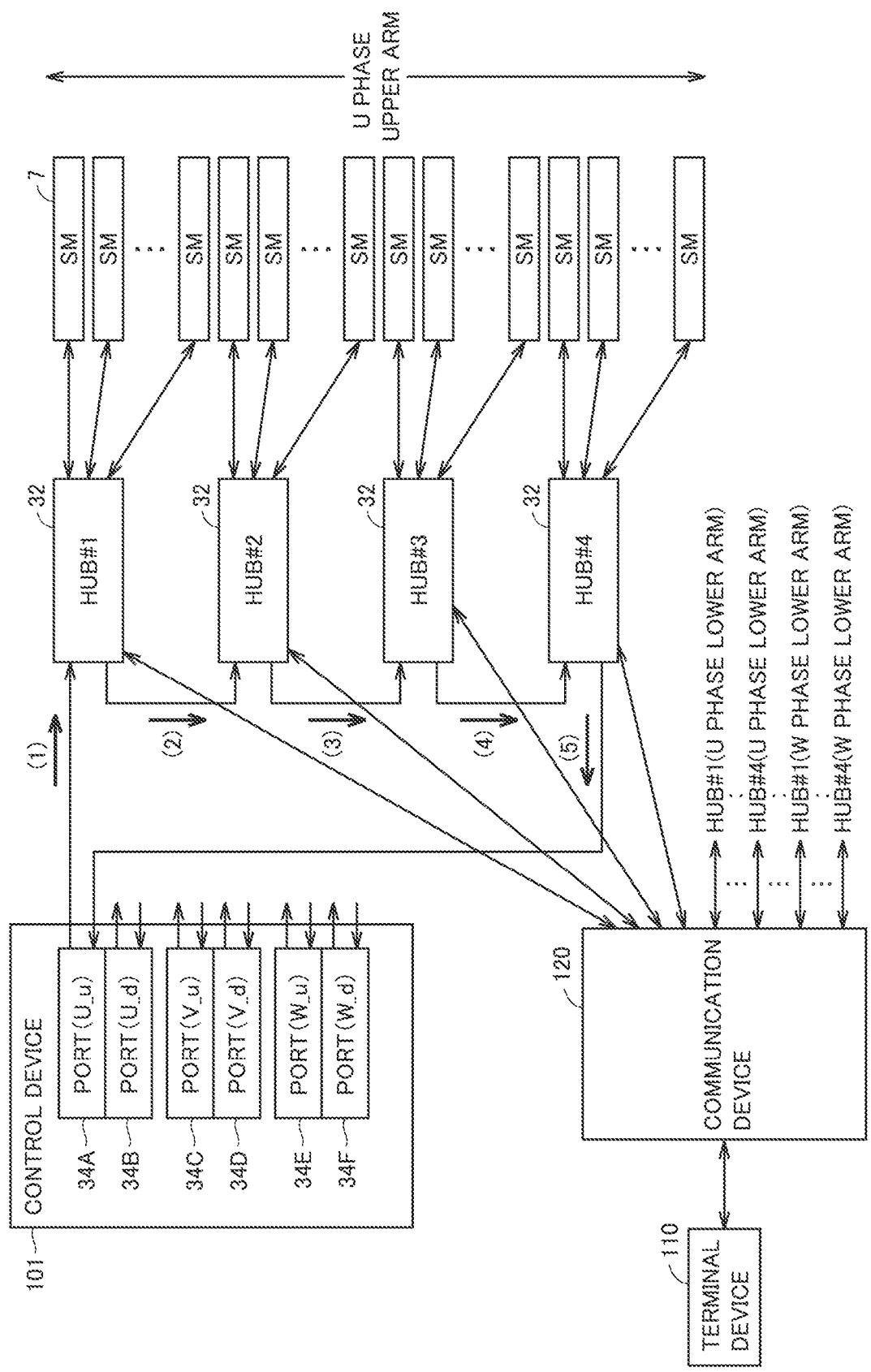
FIG. 5 shows another example of a network configuration between the control device and the terminal device, and each repeating device.

FIG. 5 shows another example of a network configuration between control device 101/terminal device 110 and each repeating device 32. Referring to FIG. 5, a plurality of communication ports 34A to 34F are connected to a plurality of repeating devices 32 through the ring topology. For example, communication port 34A is connected to four repeating devices 32 (corresponding to HUB #1 to #4 in the drawing) for the U phase upper arm through the ring topology. Each repeating device 32 is connected to a plurality of submodules 7 through the star topology. A communication frame that is output from communication port 34A is transmitted in the order of the numerals in the parentheses in FIG. 5, i.e., (1), (2), (3), (4), (5). The method for transmitting communication frames that are output from respective communication ports 34B to 34F is similar to the method for transmitting the communication frame that is output from communication port 34A.

Terminal device 110 communicates with repeating device 32 for each arm, through communication device 120. Communication device 120 is connected to four repeating devices 32 for each arm, through the star topology. Terminal device 110 may be configured to communicate with control device 101 and protection device 102. In this case, terminal device 110 transmits, information indicating an instruction from a maintenance operator, to control device 101 and protection device 102, for example.

The network configuration for protection device 102 and each repeating device 32 is similar to the network configurations for control device 101 and each repeating device 32 as described above and shown in FIGS. 4 and 5.

<Configuration of Repeating Device>

Figure 6:
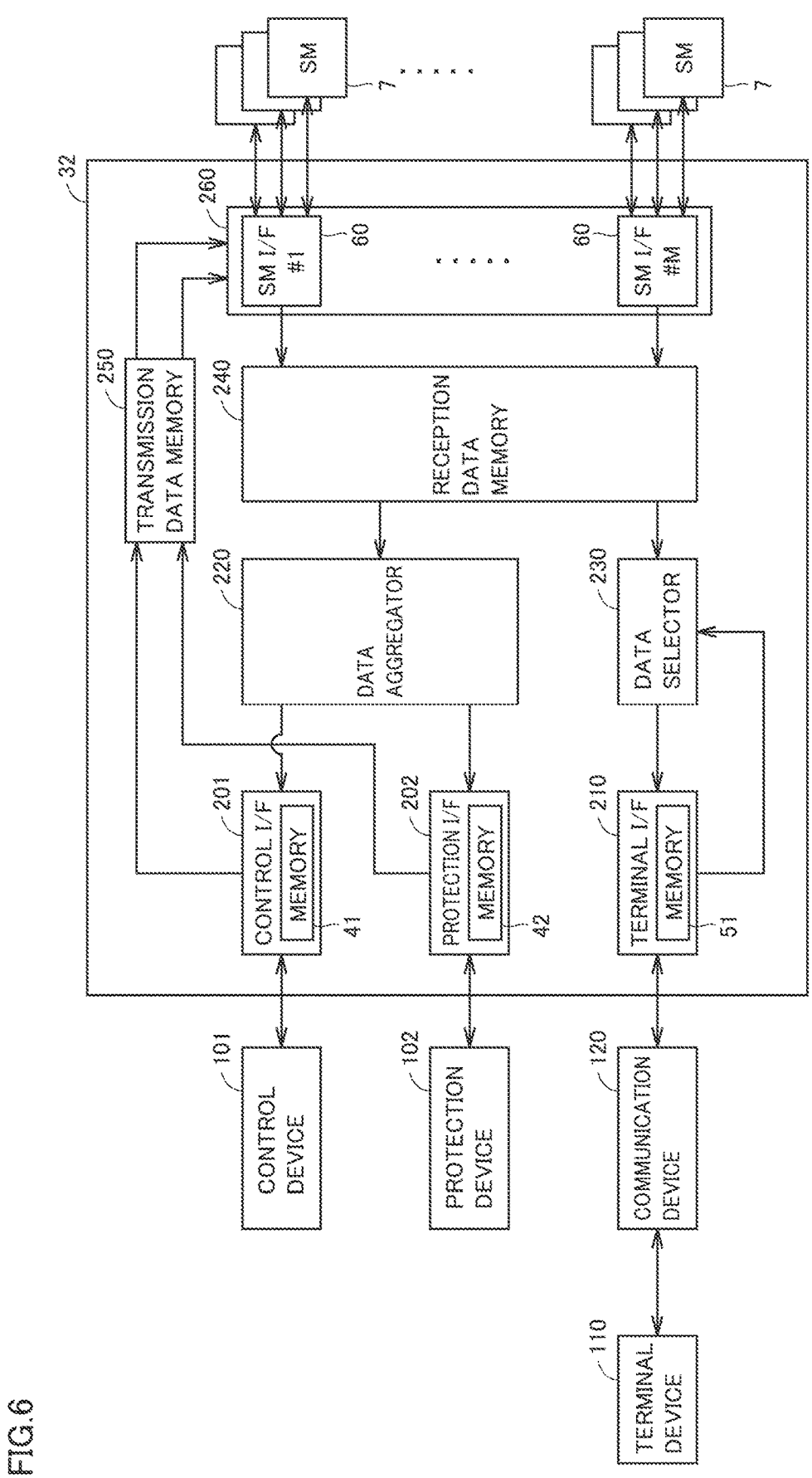
FIG. 6 is a block diagram showing an example of a functional configuration of a repeating device.

FIG. 6 is a block diagram showing an example of a functional configuration of repeating device 32. Referring to FIG. 6, repeating device 32 includes a communication interface unit (corresponding to "control I/F" in the drawing) 201 for control device 101, an interface unit (corresponding to "protection I/F" in the drawing) 202 for protection device 102, a communication interface unit (corresponding to "terminal I/F" in the drawing) 210 for terminal device 110, a data aggregator 220, a data selector 230, a reception data memory 240, a transmission data memory 250, and a communication interface group 260 for submodules 7. Each function of repeating device 32 may be implemented by means of an FPGA (Field Programmable Gate Array) or the like, of implemented through execution, by a CPU, of a program stored in a ROM.

Communication interface unit 201 transmits and receives a communication frame for control device 101, communication interface unit 202 transmits and receives a communication frame for protection device 102, and communication interface unit 210 transmits and receives a communication frame for terminal device 110. Communication interface units 201, 202 are implemented by an interface dedicated to self-excited HVDC, and typically the wired communication method is used for these communication interface units.

In contrast, communication interface unit 210 is implemented by a general-purpose interface (interface for an IP network, for example). The communication method used for communication interface unit 210 may be the wired communication method, or the wireless communication method through a wireless LAN (Local Area Network).

Communication interface unit 201 includes an internal memory 41 storing information transmitted/received between repeating device 32 and control device 101. Communication interface unit 202 includes an internal memory 42 storing information transmitted/received between repeating device 32 and protection device 102. Communication interface unit 210 includes an internal memory 51 storing information transmitted/received between repeating device 32 and terminal device 110.

Figure 7:
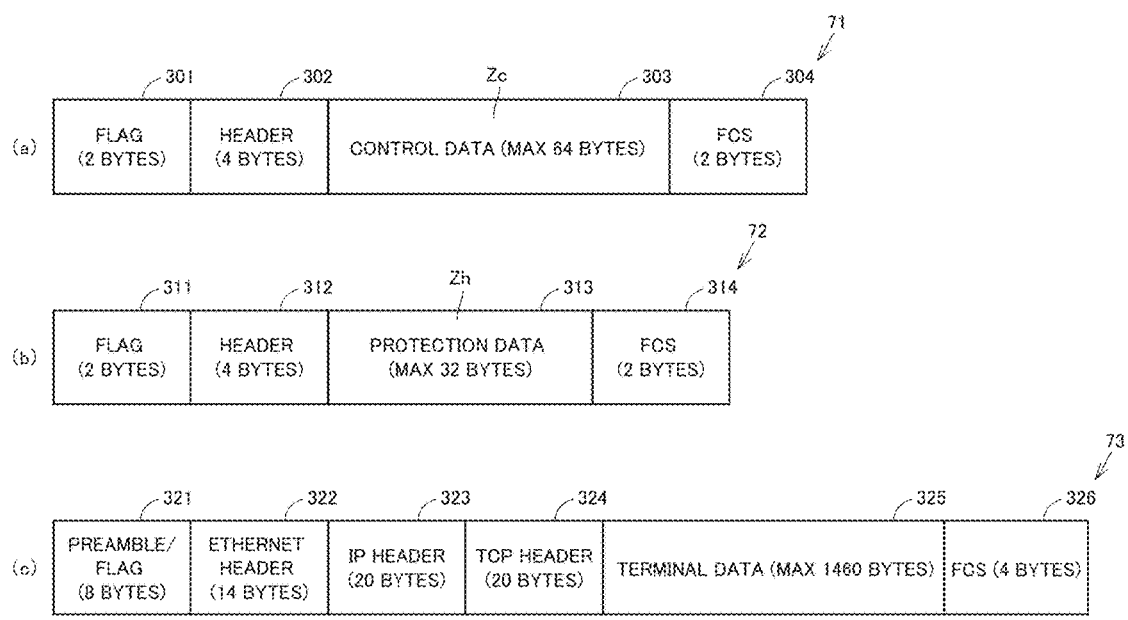
FIG. 7 schematically shows an example configuration of each communication frame.

FIG. 7 schematically shows an example configuration of each communication frame. In FIG. 7, (a) shows a configuration of a communication frame 71 for control device 101, (b) shows a configuration of a communication frame 72 for protection device 102, and (c) shows a configuration of a communication frame 73 for terminal device 110.

Communication frame 71 includes a flag region 301, a header region 302, a control data region 303, and an FCS (Frame Check Sequence) region 304 in which error detection information is stored. In header region 302, information such as a communication command, a sequence number, and a payload length are stored. In control data region 303, a control command, and aggregate information Zc that is an aggregate of SM internal information about respective submodules 7, for example, are included. Aggregate information Zc includes an aggregate value of capacitor voltages (also referred to as "SM voltage" hereinafter) of respective submodules 7 communicating with repeating device 32, and an aggregate value of state information about respective submodules 7. For example, flag region 301, header region 302, control data region 303, and FCS region 304 have their sizes of 2 bytes, 4 bytes, maximum 64 bytes, and 2 bytes, respectively.

Communication frame 72 includes a flag region 311, a header region 312, a protection data region 313, and an FCS region 314. In protection data region 313, a protection command including a stop command, aggregate information Zh that is an aggregate of SM internal information about respective submodules 7, for example, are included. Aggregate information Zh includes an aggregate value of the state information of respective submodules 7, and includes no SM voltage. For example, flag region 311, header region 312, protection data region 313, and FCS region 314 have their sizes of 2 bytes, 4 bytes, maximum 32 bytes, and 2 bytes, respectively.

Communication frame 73 is an Ethernet® frame, for example, and includes a preamble/flag region 321, an Ethernet header region 322, an IP header region 323, a TCP header region 324, a terminal data region 325, and an FCS region 326.

Terminal data region 325 includes SM internal information about one or more submodules 7 selected from SM internal information about respective submodules 7. In other words, terminal data region 325 stores individual SM internal information itself, rather than information generated by aggregating SM internal information about respective SMs. For example, preamble/flag region 321, Ethernet header region 322, IP header region 323, TCP header region 324, terminal data region 325, and FCS region 326 have their sizes of 8 bytes, 14 bytes, 20 bytes, 20 bytes, maximum 1460 bytes, and 4 bytes, respectively.

Communication frame 73 for terminal device 110 has a larger frame size than respective frame sizes of communication frame 71 for control device 101 and communication frame 72 for protection device 102, as described above. It is therefore possible to store, at a time, a larger amount of information in communication frame 73.

Referring again to FIG. 6, communication interface unit 201 extracts a control command from communication frame 71 received from control device 101 and stores the control command in transmission data memory 250. Transmission data memory 250 is a memory for storing information to be transmitted to submodule 7. Typically, communication interface unit 201 stores received communication frame 71 in internal memory 41.

Communication interface unit 202 extracts a protection command from communication frame 72 received from protection device 102, and stores the protection command in transmission data memory 250. Typically, communication interface unit 202 stores received communication frame 72 in internal memory 42.

Communication interface group 260 includes M piece(s) (an integer satisfying M≥1) of SM interface(s) (corresponding to "SM I/F" in the drawing) 60 communicating with submodules 7. M pieces of SM interfaces are distinguished from each other by numbers #1 to #M allocated thereto for the sake of convenience. Each SM interface 60 is connected to a predetermined number of submodules 7 through a network of the star topology.

Each SM interface 60 retrieves a control command and a protection command included in transmission data memory 250, and transmits a communication frame including the control command and the protection command to each submodule 7 connected to the SM interface. Each SM interface 60 also receives a communication frame including SM internal information from each submodule 7 connected to the SM interface, and stores the SM internal information in reception data memory 240.

Typically, the transmission of the communication frame including the control command and the protection command and the reception of the communication frame including the SM internal information are done simultaneously during communication performed once between SM interface 60 and submodules 7. SM interface 60 communicates with submodules 7 with communication cycle period T3.

In reception data memory 240, SM internal information about each submodule 7 connected to repeating device 32 is stored. Typically, the latest SM internal information is stored in reception data memory 240 for each communication cycle period T3 and thereby overwrites the older SM internal information.

Data aggregator 220 generates aggregate information by aggregating SM internal information stored in reception data memory 240. The SM internal information includes the SM voltage and the state information about submodule 7 as described above.

The state information includes operational information indicating an operational state of submodule 7, failure rank information indicating the degree of failure, and failure type information indicating the type of failure. The operational information of submodule 7 includes an activation bit indicating whether the submodule is active or not, a failure bit indicating whether the submodule is failing or not, and a separation bit depending on the failure bit indicating a failure state. The separation bit is information indicating whether failing submodule 7 has been separated from the arm. The failure rank information includes information indicating whether submodule 7 can operate or not. The operational information may also include a control bit indicating whether operation of the submodule is being controlled or not, and a stop bit indicating whether the submodule is being stopped or not.

Data aggregator 220 sums SM voltages included in SM internal information to generate a voltage aggregate value corresponding to SM voltage aggregate information. Data aggregator 220 generates an activation bit aggregate value, an active SM number aggregate value, and a failure bit aggregate value, as aggregate values of the state information.

The activation bit aggregate value is the logical conjunction of activation bits received from respective submodules 7. For example, when all submodules 7 connected to repeating device 32 are active, the logical conjunction is "1" and, when at least one submodule 7 is not active, the logical conjunction is "0." The value of the logical conjunction can be used to determine whether or not all submodules 7 connected to repeating device 32 are active.

The active SM number aggregate value is the sum of activation bits received from respective submodules 7. The sum corresponds to the number of submodules 7 that have been activated, among submodules 7 connected to repeating device 32.

The failure bit aggregate value is the logical disjunction of failure bits received from respective submodules 7. For example, when none of all submodules 7 connected to repeating device 32 has failed, the logical disjunction is "0" and, when at least one submodule 7 has failed, the logical disjunction is "1." The value of the logical disjunction can be used to determine whether any submodule 7 is failing among submodules 7 connected to repeating device 32.

Data aggregator 220 stores aggregate information Zc including the voltage aggregate value and the aggregate value of the state information, in internal memory 41 of communication interface unit 201. Data aggregator 220 stores aggregate information Zh including the aggregate value of the state information, in internal memory 42 of communication interface unit 202. Communication interface unit 201 transmits communication frame 71 including aggregate information Zc to control device 101 with control cycle period T1. Communication interface unit 202 transmits communication frame 72 including aggregate information Zh to protection device 102.

Typically, communication interface unit 201 receives communication frame 71 including a control command from control device 101 and transmits communication frame 71 including aggregate information Zc to control device 101, with communication cycle period T1. Communication interface unit 202 receives communication frame 72 including a protection command from protection device 102 and transmits communication frame 72 including aggregate information Zh to protection device 102, with communication cycle period T1. Thus, communication frame 71 is transmitted through communication interface unit 201 to control device 101 with communication cycle period T1, and communication frame 72 is transmitted through communication interface unit 202 to protection device 102 with communication cycle period T1.

Data selector 230 selects at least one piece of internal information from SM internal information stored in reception data memory 240. Typically, data selector 230 selects SM internal information satisfying a request from terminal device 110. Specifically, communication interface unit 210 receives information about a request to select SM internal information, from terminal device 110 through communication device 120, and instructs data selector 230 to select SM internal information in accordance with the information about the request to select. Data selector 230 selects the SM internal information following the instruction, and stores the selected SM internal information in internal memory 51 of communication interface unit 210.

Communication interface unit 210 transmits communication frame 73 including the selected SM internal information to terminal device 110 through communication device 120. Typically, communication interface unit 210 transmits to terminal device 110, with communication cycle period T2 longer than communication cycle period T1, communication frame 73 including the SM internal information selected to satisfy the request from terminal device 110.

Figure 8:
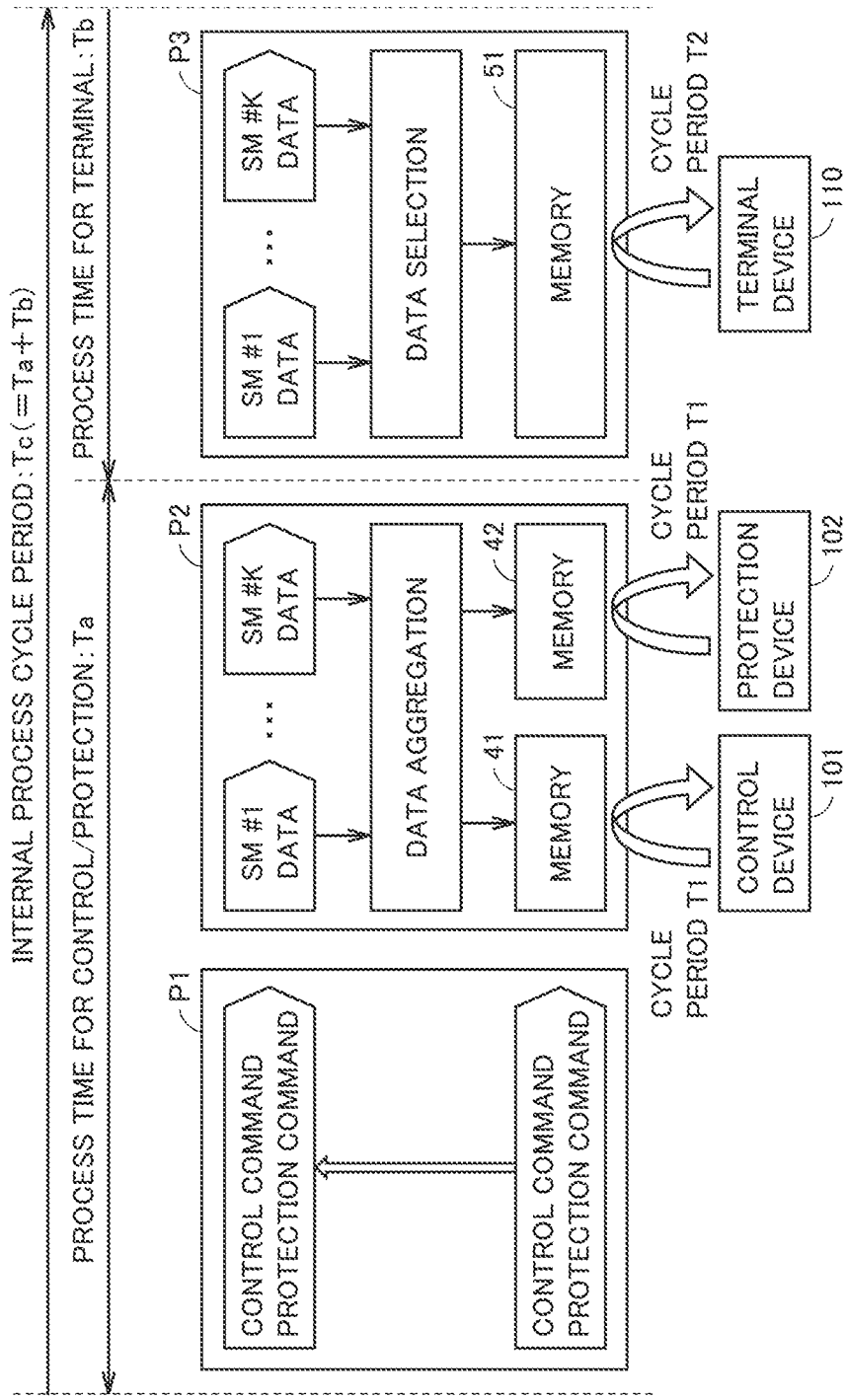
FIG. 8 illustrates an internal process of a repeating device.

FIG. 8 illustrates an internal process of repeating device 32. Referring to FIG. 8, repeating device 32 performs the internal process with a process cycle period Tc (20 μs, for example). The internal process of repeating device 32 is divided into processes P1, P2 for control device 101 and protection device 102, and a process P3 for terminal device 110. The total process time of process P1 and process P2 is Ta (17 μs, for example), and the process time of process P3 is Tb (3 μs, for example). It is necessary to ensure that processes P1, P2 for control device 101 and protection device 102 are performed in real time, and therefore, a longer time is allocated to these processes than the time allocated to process P3 for terminal device 110.

Process P1 is a process performed by repeating device 32 to store, in transmission data memory 250, a control command received from control device 101 and a protection command received from protection device 102. Process P2 is a process performed by repeating device 32 to generate aggregate information Zc, Zh based on K pieces (an integer satisfying K≥1) of SM internal information ("SM #1 data" and "SM #K data" in the drawing) stored in reception data memory 240, and store the generated aggregate information Zc, Zh in internal memories 41, 42, respectively.

Process P3 is a process performed by repeating device 32 to perform data selection for selecting at least one piece of SM internal information from the K pieces of SM internal information, in accordance with a request from terminal device 110, and store the selected SM internal information in internal memory 51. Thus, in process P3, data aggregation like the one in process P2 for control device 101 and protection device 102 is not performed.

Control device 101 and protection device 102 require fast processing, and therefore, repeating device 32 communicates with control device 101 and protection device 102 with a significantly short communication cycle period T1 (100 μs, for example). In order to achieve shorter communication cycle period T1, repeating device 32 generates aggregate information (aggregate information Zc, Zh, for example) of a smaller data size by performing data aggregation of SM internal information to reduce the size of a communication frame (communication frames 71, 72, for example) including this aggregate information. In other words, in order to achieve communication with a shorter cycle period using a communication frame of a smaller size, repeating device 32 performs data aggregation of SM internal information. Accordingly, fast communication is achieved between control device 101/protection device 102 and repeating device 32.

In contrast, repeating device 32 communicates with terminal device 110 with relatively longer communication cycle period T2 (10 ms, for example). Terminal device 110 is a device having a purpose of displaying information to maintenance operators, and thus it is enough for terminal device 110 to be able to update its screen with a cycle period of a few seconds, so that it is sufficient for repeating device 32 and terminal device 110 to communicate with each other with a communication cycle period of approximately 10 ms. It is assumed by way of example that the number of submodules 7 communicating with repeating device 32 is 100 and communication frame 73 can store SM internal information of only one submodule 7. In this case, the time required for obtaining SM internal information of all the 100 submodules 7 is one second.

The communication cycle period for communication between repeating device 32 and terminal device 110 may be relatively longer, and therefore, repeating device 32 can use communication frame 73 of a larger data size to transmit a larger amount information at a time to terminal device 110. Accordingly, terminal device 110 that is often used for the purpose of maintenance of submodules 7 can display detailed information about submodules 7.

Cycle period Tc for the internal process of repeating device 32 is set shorter than communication cycle period T1 for communication between repeating device 32 and control device 101/protection device 102. Thus, latest aggregate information Zc and aggregate information Zh are transmitted to control device 101 and protection device 102, respectively.

Advantages

According to the present embodiment, latency-oriented communication between the host device and the repeating device and throughput-oriented communication between the terminal device and the repeating device can both be achieved.

OTHER EMBODIMENTS

The configuration presented above as an embodiment by way of example is an example of the configuration of the present disclosure, and may be combined with another known technique, or modified by being omitted partially to the extent that does not go beyond the scope of the present disclosure.

It should be construed that the embodiments disclosed herein are given by way of illustration in all respects, not by way of limitation. It is intended that the scope of the present disclosure is defined by claims, not by the description above, and encompasses all modifications and variations equivalent in meaning and scope to the claims.

REFERENCE SIGNS LIST

1 power conversion device; 2 power conversion circuitry; 3 command generation device; 4u, 4v, 4w leg circuit; 5 upper arm; 6 lower arm; 7 submodule; 8A, 8B reactor; 9A, 9B arm current detection device; 10 AC voltage detection device; 11A, 11B DC voltage detection device; 12 AC circuit; 13 interconnection transformer; 14 DC circuit; 16 AC current detection device; 21 gate controller; 22A, 22B switching device; 23A, 23B diode; 24 capacitor; 27 voltage detector; 28 transmission and reception device; 32 repeating device; 34A-34F communication port; 41, 42, 51 internal memory; 71, 72, 73 communication frame; 101 control device; 102 protection device; 110 terminal device; 120 communication device; 201, 202, 210 communication interface unit; 220 data aggregator; 230 data selector; 240 reception data memory; 250 transmission data memory; 260 communication interface group; 320 repeating device group

The invention claimed is:

1. A power conversion system comprising:
   power conversion circuitry including a plurality of submodules connected in series to each other;
   a host device to control each submodule included in the power conversion circuitry;
   a terminal device to display internal information about each submodule; and
   at least one repeating device to relay communication between the host device and each submodule and communication between the terminal device and each submodule, wherein
   the repeating device
     receives, from one or more submodules communicating with the repeating device, internal information about the submodules,
     transmits, to the host device with a first cycle period, a first communication frame including aggregate information that is an aggregate of the received internal information, and
     transmits, to the terminal device with a second cycle period longer than the first cycle period, a second communication frame including internal information selected from the received internal information,
     stores the received internal information in a first memory, and
     selects, from the internal information stored in the first memory, internal information satisfying a request from the terminal device,
   wherein the repeating device generates the aggregate information by aggregating the internal information stored in the first memory, wherein
   a cycle period for an internal process performed by the repeating device is shorter than the first cycle period, and
   the internal process includes:
     a first process performed by the repeating device to store, in a second memory, command information received from the host device;
     a second process performed by the repeating device to generate the aggregate information based on the internal information stored in the first memory and store the aggregate information in a third memory; and
     a third process performed by the repeating device to select internal information satisfying the request from the internal information stored in the first memory, and store the selected internal information in a fourth memory.

2. The power conversion system according to claim 1, wherein the second communication frame has a size larger than a size of the first communication frame.

3. The power conversion system according to claim 1, wherein
   the first communication frame is transmitted through a first communication interface to the host device with the first cycle period, and
   the second communication frame is transmitted through a second communication interface to the terminal device with the second cycle period.

4. The power conversion system according to claim 1, wherein
   the second memory stores information to be transmitted to the one or more submodules,
   the third memory stores information to be transmitted to the host device, and
   the fourth memory stores information to be transmitted to the terminal device.

5. The power conversion system according to claim 1, wherein
   the host device includes a plurality of communication ports provided in association with respective arms included in the power conversion circuitry, and
   each of the communication ports is connected to two or more of the repeating devices through a network of a ring topology.

6. The power conversion system according to claim 2, wherein
   the first communication frame is transmitted through a first communication interface to the host device with the first cycle period, and
   the second communication frame is transmitted through a second communication interface to the terminal device with the second cycle period.

7. The power conversion system according to claim 2, wherein
   the host device includes a plurality of communication ports provided in association with respective arms included in the power conversion circuitry, and
   each of the communication ports is connected to two or more of the repeating devices through a network of a ring topology.

8. The power conversion system according to claim 3, wherein
   the host device includes a plurality of communication ports provided in association with respective arms included in the power conversion circuitry, and
   each of the communication ports is connected to two or more of the repeating devices through a network of a ring topology.

9. The power conversion system according to claim 4, wherein
   the host device includes a plurality of communication ports provided in association with respective arms included in the power conversion circuitry, and
   each of the communication ports is connected to two or more of the repeating devices through a network of a ring topology.

\* \* \* \* \*